Patented July 22, 1930

1,771,138

UNITED STATES PATENT OFFICE

EMIL E. NOVOTNY, OF PHILADELPHIA, PENNSYLVANIA, ASSIGNOR TO JOHN STOG-
DELL STOKES, OF SPRING VALLEY FARMS, HUNTINGDON VALLEY POST OFFICE,
PENNSYLVANIA

PAPER PRODUCT AND PROCESS OF MAKING THE SAME

No Drawing. Original application filed August 5, 1926, Serial No. 127,482. Divided and this application
filed July 8, 1927. Serial No. 204,409.

This invention relates to plastics and plastic compositions and the process of making the same. It is more particularly directed to the production of synthetic resin condensation products of xylenols and formaldehyde of high dielectric strength and low moisture absorption and is preferably combined in such a manner that products of low viscosity and high penetrating power are obtained. The product is most particularly intended for use in the manufacture of sheet laminated materials of paper, cloth, etc., useful for electrical insulation and various mechanical structures but is most particularly directed to products of this kind where the requirements are for high dielectric values under adverse conditions of high humidity and heat. Products capable of meeting high electrical tests under these adverse conditions are highly desirable and of great value under ordinary conditions of use.

This application is a division of my prior application, Serial No. 127,482, filed August 5, 1926, and entitled: "Synthetic resins and method of making the same."

The xylenols produce condensation products of high reactivity when condensed with an aldehyde, more particularly formaldehyde, without the use of a condensing or catalytic agent. The reaction product made from these phenolic homologues and formaldehyde without the use of a condensing or catalytic agent gives resinous condensation products of great purity in that no extraneous materials need be used to carry out this reaction on a large commercial scale. When a catalyst is present in the reacting digester where this reaction is carried out, the final product is non-uniform in that certain portions of the mass are carried over too far to give the most satisfactory results for this special technical purpose. Where a basic catalyst is used even in small quantities as at present considered in the art of say one to two per cent of sodium or potassium carbonate or hydroxide, the reaction is extremely difficult to control and the end product is evidently a mixture of highly reacted or polymerized condensation products with other products still in their uncombined state or in a relatively loosely combined condition. Where the catalyst is reduced to say .01 of the quantity specified above or .01 to .02 per cent of the xylenol used the reaction requires precautions when digesting a large quantity of material at a time and there is present this trace of hydrolyzable material which is objectionable in the final infusible product.

Where the reaction between the xylenols and formaldehyde is carried out without the use of condensing agents the reaction is carried out with precision and the only precaution necessary is to stop the reaction at the proper point when the materials have been sufficiently combined and when a product of the desired viscosity has been obtained. This product gives values extremely low in moisture absorption, indicating free and uniform impregnation of the fibres and a thorough enveloping of these particles with the result that high dielectric strength is obtained. The use of kraft paper for laminated fiber structures offers many advantages because of its cheapness and strength. It is extremely difficult to impregnate this material and great precautions are necessary to secure a paper having the right absorptive index in order that it may be used and that satisfactory physical and electrical values may be obtained in the laminated structure formed therefrom when impregnated with the usual phenol or cresol formaldehyde plus alkali condensation products. Although the xylenol is relatively cheap compared to phenol or good grades of meta and para cresol, it is capable of producing condensation products when combined with formaldehyde having a low viscosity and great penetrating power, and the final end products are high in dielectric and mechanical strength, and even in kraft paper the tensile split is very high.

It has been the contention that phenol-formaldehyde condensation products made without a catalyst react but slowly as, for example, in the Story British Patent No. 8875 of 1905. Note also paper read by Dr. Baekeland before the New York section of the American Chemical Society on February 5, 1909, and published in the Journal of Industrial and Engineering Chemistry in 1909, volume 1, pages 149 to 161, wherein he speaks of the slow reactivity of Story's product. However, during all this discussion no mention is made that resinous condensation products of phenols or their homologues or more specifically the xylenols when reacted with formaldehyde would give products relatively superior in electrical properties than where these materials are made in the presence of a condensing agent. Resinous phenolic condensation products lack many of the good attributes of other insulating materials and much of this deficiency is due to the use of catalysts or condensing agents.

It is true that the reaction between phenol and formaldehyde is quite slow when no condensing agent is used, but for certain purposes it is possible to produce commercial products of very high electrical value, although, of course, the reaction is somewhat slower. On the other hand, for certain purposes the reaction may be speeded by the use of high temperatures.

The xylenols, however, have higher boiling points than phenols and therefore the rate of reaction is greatly increased as will be noted in the example to be given later. The reaction is usually carried out in from two to two and one-half hours which is a very convenient duration of time where large commercial batches of material are made. On subsequent impregnation into a sheetlike product such as kraft paper it will be found that the loss in resin volatile substance is no greater than where a catalyst is used. Upon subsequently pressing the product under the usual temperatures, pressures and duration of time used for the production of products of this type heretofore utilizing materials including catalytic agents, no increased time is required and the product assumes a hard, infusible, relatively insoluble form having high physical and electrical values.

By my choice of raw material and the carrying of the reaction through its resinous condensation cycle without a catalytic or condensing agent, it is possible to produce a synthetic resin product of xylenols and formaldehyde which has all the reactivity necessary for its use either as a varnish for incorporation into textile or paper products or as a solid resin to be ground and incorporated in various paper products at the beaters of the paper mill.

When this material is used for incorporation at the beaters of the paper mill it will be found, likewise, that the xylenols are much less soluble in water and that it is not at all necessary to first add additional phenolic bodies to the waters at the beaters in order to obviate the loss of xylenol which may be in a more or less free state within the resinous body. Evidently this has been found a desirable practice with certain types of phenol-cresol-formaldehyde resins as has been brought out in some of the recent patent art. The elimination of this step simplifies the process of introducing a resinous product at the beaters of the paper mill as it is only necessary to introduce the proper proportion of this finely ground, comminuted resin at the beaters or thoroughly mix or commingle the same with the paper pulp or furnish. It is also found objectionable to use a hardening agent such as hexamethylenetetramine, first because the hexamethylenetetramine liberates large amounts of ammonia and certain of this ammonia becomes entrapped within the product and some combines with the resin forming a resinate. Secondly, hexamethlyenetetramine is readily soluble in water and therefore cannot be introduced at the beaters unless it had previously been combined with the resinous product.

Where the product is mixed with the paper pulp at the beaters or in the stuff chest the only precautions necessary are to make sure that the material is properly mixed with the fibres and that when formed in sheetlike form the temperature of the drying rolls or drying tunnels be maintained well below the critical reacting temperature of the resin.

In order that my invention may be better understood, the following examples are given by way of illustration—

*Example 1*

Xylenol, commercial grade 32 parts.
Formaldehyde, commercial grade 37 to 40 per cent strength 21.2 parts.

These materials are placed into a suitable digester equipped with an efficient stirrer and provided with a suitable condenser for distillation. With the condenser set in a distillation angle the product is boiled vigorously, stirring being maintained during the entire reaction and distillation cycle. There is evidently an immediate combination between the xylenols and formaldehyde as there is only a trace of formaldehyde present in the distillate, moreover, the distillate has practically no formaldehyde odor. It should be noted particularly that no step is called for in this process whereby a refluxing reaction is maintained during any portion of this cycle.

The boiling and distillation is continued for about two hours or for such a length of time and under such conditions of temperature control, etc. until the desired viscosity or combination has been obtained. The reaction goes along smoothly and the removal of both the water of solution and condensation may be removed with little difficulty at ordinary atmospheric pressure as the reaction product is thin at the early stages of the reaction and as the solubility of water in xylenol is low.

From 15 to 18 parts of distillate will be removed depending on the completeness of the reaction and on the strength of the formaldehyde solution used. The temperature of the contents of the digester start boiling at about 212° F. and the temperature increases as the water is eliminated until a temperature of 280° F. is preferably reached. At this temperature the product will be a hard grindable resin. For varnishes and gums an end temperature of from 250° F. to 270° F. will produce a desirable product. With vacuum distillation at the end of the reaction or say after a temperature of 250° F. has been reached a hard resin can be obtained on large batches with less precautions.

Although no refluxing has been carried out as previously stated there is less loss of reagents than if the reaction were carried out under reflux conditions. Under this method of operation the contact between the two reagents, i. e., xylenol and formaldehyde, is better because of the elimination of the water of reaction as the condensation progresses. It will be noted that the proportion of the reagents used as given in this example is approximately in equal molecular proportion and that the resin does not remain permanently fusible; and that, therefore, there is no appreciable loss of formaldehyde when xylenols are used and that no contracting pressure or refluxing is necessary to retain the predetermined amount of reagent proportions.

So far as the proportion of reagents is concerned a wide variation is possible, that is, an excess of formaldehyde will take care of itself by either a further combination or will be eliminated during the subsequent drying or processing operations, and so far as the xylenols are concerned they will likewise be evaporated or driven off so that under proper drying conditions a wider variation in the proportion of the reagent can be used and still final infusible substantially insoluble product may be obtained when the final hardening reaction is carried out. This statement also applies to Example No. 2 given below. This example is given as illustrative of the reaction carried out under conditions of preliminary refluxing and subsequent distillation.

*Example 2.*

Xylenol, commercial grade, 61 parts.
Formaldehyde, commercial grade 37 to 40%, 40.5 parts.

These materials are placed into a suitable digester equipped with a condenser for both reflux and distillation. The product is boiled under reflux for from two to two and one-quarter hours, stirring rapidly until a product of the desired viscosity is obtained. Adjust condenser for distillation and distill to remove as much water as possible. When a temperature of 300° F. has been reached the product will be ready for use if a varnish is to be manufactured, or, in other words, the resin will be of relatively low viscosity and low melting point. If the distillation is conducted under a vacuum a solid resin will be obtained at somewhat lower temperature.

Under the proportions as given the water of solution would consist of approximately 25.5 parts and the water of reaction 9.0 parts or a total water content of 34.5 parts. Where the varnish is produced without vacuum distillation it will be found that the total water distilled will not greatly exceed 31 parts. Some water of condensation is still included in the mass and some of the reacting materials have not been entirely combined, but this has no undesirable objections where relatively thin sheets are impregnated in varnish form and dried thoroughly subsequent to the final pressing operation.

To this material while still hot and with the condenser set at the reflux position, I add alcohol 24 parts and furfural 2 parts. The alcohol is added in order to obtain a thin mass which may be readily used for impregnation and additional quantities of alcohol may be added if necessary before the material is used.

To the gums or resins made according to the process disclosures given in either examples one or two various hardening agents may be added such as, for example, hexamethylenetetramine, polymerized formaldehyde or various bodies having active methylene groups in condition to combine with the resinous products or for that matter other aldehydes or their derivatives such as furfural or furfuramid. The product, however, is complete in itself and no hardening agent is necessary unless it be used more in the nature of an accelerating agent in order to promote the speed or lower the temperature at which the reaction is brought to a final infusible form.

The furfural is added for the purpose of acting as a neutral final hardening agent assisting in converting the resinous product upon final pressing to its final hard and infusible form. In the place of furfural a neutral well washed furfuramid may be added in from one to ten per cent of the weight of the resin solids. This furfuramid, however, where the product is to be used for the highest grade of electrical structure, is objectionable as it breaks down to furane, furfural and ammonia. Likewise, hexamethylenetetramine can be used as a hardening agent, but this also is objectionable because of the ammonia liberated.

The use of a hardening agent is not essential as the material is complete in itself and will upon subsequent heating go to the infusible, substantially insoluble state. There is no objection, however, to the use of furfural itself as the product is neutral and will not affect the dielectric properties of the synthetic resin.

Various coloring materials, dyes, pigments, etc., the dyes preferably soluble in the solvents used and the pigments preferably in colloidal suspension, may be added before, during or at the end of the reaction. Various modifying agents may be added such as camphor, oil of camphor, lanolin, or China wood oil. These modifying agents are usually added through the use of other solvents than alcohol as, for example, where lanolin is used this is added in a dissolved state with benzol. Where China wood oil is used this is preferably added by using about twice the weight of the China wood oil in furfural, benzol or carbon tetrachloride. These modifying agents tend to make the material more plastic so it may be more readily machined, cut, punched, etc., when in the cold state.

Various lubricants may be added such as, for example, a quantity of camphor, stearic acid, or calcium stearate.

Wherein I have called for the use of xylenol it is to be understood that the commercial grade of xylenols include certain lower boiling fractions and certain higher boiling fractions which are in no way detrimental for my purpose. It is, of course, also evident that the use of xylenols because of their high boiling range and excellent resin solvent properties and tendency to form a gel makes them useful when added in various proportions to other phenolic bodies and therefore, it is to be understood that I wish this use included wherein I claim the use of xylenols.

Wherein I have called for the use of formaldehyde or aqueous solution of formaldehyde it is to be understood that I can use formaldehyde gas or various forms of polymerized formaldehyde or other useful substances having active methylene groups in condition to combine with either the xylenols or the resinous condensation products produced from them. It is, however, to be noted that the invention of this specification is the use of an active methylene body which will not liberate undesirable bases or acids whereby the electrical properties of the product would be impaired.

Wherein I have shown that the resin is preferably alcohol soluble it is to be understood that this material is soluble in various other organic solvents such as acetone, furfural, etc. or a mixture of alcohol and benzol in various proportions or, for that matter, a mixture of benzol and furfural may be used as solvents for this resinous product. The resinous products, on the other hand, may be reacted to the point where they are no longer soluble in alcohol but require certain higher solvents such as, for example, acetone or furfural, or mixtures of these. These resinous products when no longer soluble in alcohol are more highly polymerized and the penetration of varnish solvents may be regulated by the degree of preliminary polymerization.

It is to be understood that these resinous condensation products of xylenols and formaldehyde are soluble in 15% alkaline solutions such as sodium or potassium hydroxide and that they are precipitated out of solution by the use of a suitable quantity of acid or, for that matter, by alum such as ordinary potassium alum. These resinous products when in suitable form either in solution or in finely comminuted particles, may be incorporated with various spun or woven textile or paper products at the time such products are being formed or at any preferred time thereafter. When so combined with these textile products they act as reinforcing cementitious materials which may be subsequently reacted under heat or heat and pressure to their final infusible form. For certain classes of work where solvent recovery is not possible it is preferable to introduce these resinous products into these textile or paper products by direct incorporation methods at a considerable saving in solvent cost.

While the synthetic resin products made of xylenols or mixtures or other phenolic bodies with xylenol and formaldehyde are particularly well adapted for use in making laminated paper and textile products, they are also useful for the manufacture of comminuted molding powders when mixed or incorporated with suitable organic or inorganic fillers, plasticisers and modifying agents.

These synthetic resin products when in solution as a varnish mix well with pyroxylin products producing lacquers of a very desirable quality. As the synthetic resin products polymerize gradually at ordinary room temperature the film of pyroxylin lacquer becomes stronger and tougher with age. The resinous product furthermore leaves a glossy, shiny film, does not weaken, and increases the adhesion of the film to the supporting body. It has an outstanding desirable property in that when used in various quantities and even when used in small quantities it reduces the viscosity of the lacquer to such an extent that a relatively high viscosity nitrocellulose can be used and products of relatively high solids content and low viscosity can be obtained when in solution in suitable solvents. This is particularly true when some of the furfural has been caused to combine with the xylenol formaldehyde resin but the resin without the furfural added will have these same desirable properties but to a somewhat lesser extent.

What I claim is—

1. A paper like body having incorporated therewith a resinous reaction product of but two substances, namely: xylenol and formaldehyde, said product comprising a potentially reactive, fusible, resinous compound.

2. A paper like body having incorporated therewith a resinous reaction product of but two substances, namely: a phenolic body and formaldehyde and having furfural added thereto.

3. A paper like body having incorporated therewith a resinous reaction product of but two substances, namely; a phenolic body and formaldehyde and having added thereto a furfural derivative.

4. A reaction product of but two substances, namely: xylenol and formaldehyde, said product comprising a fusible resinous body incorporated in paper pulp during the manufacture of said paper like body without material loss of the original resin forming ingredients.

5. A resinous reaction product of but two substances, namely: xylenol and formaldehyde, incorporated in paper pulp during the manufacture of said paper like body without material loss of the original resin forming ingredients, and containing furfural.

6. The herein described steps in the process of making a fusible resinous reaction product of xylenols and formaldehyde comprising the incorporation of this resinous product with a fibrous material during the process of fabrication of said fibrous material into a spun, woven or sheet-like form and subsequently shaping and hardening the same through the action of heat and pressure to convert said resinous body into its infusible form.

7. The herein described method of making a moldable compound comprising a reaction product of but two substances, namely; xylenols and formaldehyde said reaction product being incorporated with suitable fibrous material during the process of fabricating such fibrous material into a sheetlike form and adding thereto an aldehyde such as furfural.

8. The herein described process of making a potentially reactive plastic comprising incorporating a xylenol-formaldehyde reaction product made without the aid of a catalyst or hardening agent other than furfural, and incorporating said reaction product in a fibrous, spinnable material during the operation of forming said fibrous material into the desired form without undue loss of reagents in order that the potential reactivity of the resinous mass will not be reduced.

Signed at Philadelphia in the county of Philadelphia and State of Pennsylvania this eighth day of June A. D., 1927.

EMIL E. NOVOTNY.